Sept. 26, 1967     W. G. KINGMA     3,343,815
CYLINDRICAL VESSEL FOR TREATING A LIQUID OR
A LIQUID MASS WITH ANOTHER MATERIAL
IN CONTINUOUS OPERATION
Filed Nov. 4, 1965

INVENTOR

WOUTER G. KINGMA

BY *Imrie & Smiley*

ATTORNEYS

United States Patent Office 3,343,815
Patented Sept. 26, 1967

3,343,815
CYLINDRICAL VESSEL FOR TREATING A LIQUID OR A LIQUID MASS WITH ANOTHER MATERIAL IN CONTINUOUS OPERATION
Wouter G. Kingma, Huizen, Netherlands, assignor to Continental Engineering, Ingenieursbureau voor de Procesindustrie N.V., Amsterdam, Netherlands, a company of the Netherlands
Filed Nov. 4, 1965, Ser. No. 506,377
3 Claims. (Cl. 259—7)

ABSTRACT OF THE DISCLOSURE

A series of rotating discs separate the interior of a container into a sequence of cells between the inlet and outlet of the container with restricted peripheral passages communicating the cells. Ribs are provided on the opposite faces of the discs to impart circular motion to liquid in the cells but the ribs on opposed faces of adjacent discs are spaced apart substantially to avoid back flow of liquid between adjacent cells.

---

The invention relates to a cylindrical vessel for treating a liquid or a liquid mass with another material in continuous operation or for holding or heating a liquid or a liquid mass to or at a predetermined temperature, said vessel being provided with discs, secured on a rotating shaft.

A vessel of this kind may be used as a reactor for carrying out various processes and in which the discs constitute cells which are in communication with each other by means of openings provided in said discs and said discs only leaving a narrow gap with respect to the circumferential wall of the vessel. It has also been proposed to secure stationary rings to the inner side of the wall of the vessel, said rings each constituting a diaphragm located between two successive discs. Due to the provision of said rings the discs may be smaller, so they do not completely extend to the wall of the vessel. With said known vessels the mass under treatment flows through the successive cells and in each cell a circulating flow is generated. With said arrangement liquid through the openings in the discs or through the gap at the circumference of the discs can flow back from a cell into the preceding cell particularly with liquids having a low viscosity, so that said liquid mixes in said preceding cell with the drawback that the residence time of the particles will be very unequal.

The invention has for its object to remove said drawback of the known vessels and according to the invention the closed or nearly closed discs on both sides are provided with ribs extending more or less radially with respect to their shaft. Said ribs increase in each cell the circulating flow and also the stirring action generated by the discs. The flowing back of liquid from a cell to a preceding cell is now prevented with the result that the residence time of the mass in the vessel will be shorter. The transfer of heat at the discs and at the circumferential wall of the vessel will be furthered by said increase of the circulating flow in the cells, so that when using hollow discs and a jacket at the wall of the vessel said arrangement will be particularly suitable for use as a heat exchanger when a cooling or heating fluid is passed through the hollow discs and the jacket of the vessel.

Figure 1:
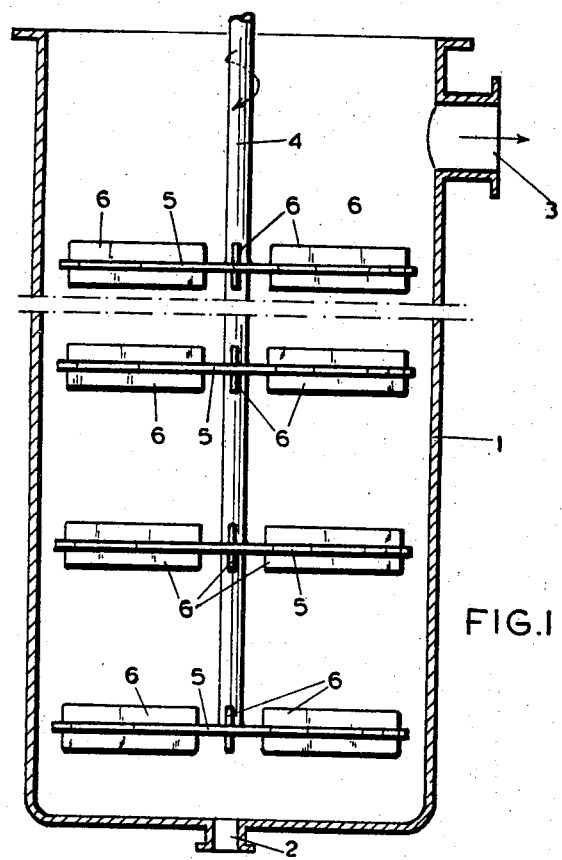
Figure 2:
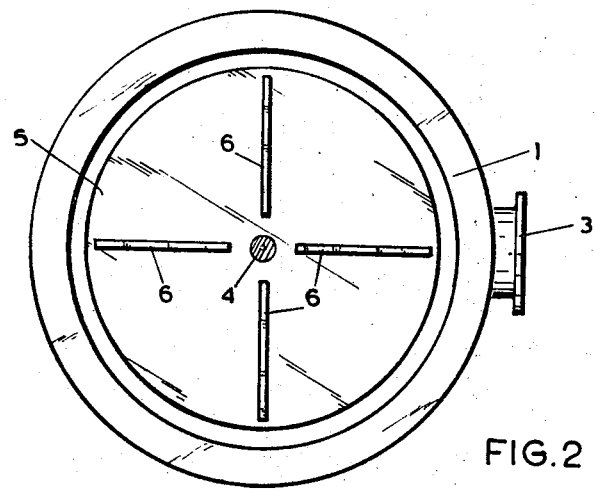

The invention will be further described with reference to the accompanying drawing showing an embodiment of the vessel according to the invention. FIG. 1 is a vertical section and FIG. 2 is a cross sectional view of the vessel.

The cylindrical vessel 1 has an inlet 2 at its bottom for the liquid to be treated and an outlet 3 near its upper end for the liquid treated. A shaft 4 provided with a drive extends in the axis of the vessel and carries a number of horizontal discs 5, which do not completely extend to the wall of the vessel, but leave a gap at said wall of one or a few centimeters. The discs 5 on both sides are provided with several radial ribs 6.

With the embodiment shown the distance between adjacent discs 5 is about one half of the internal diameter of the vessel, but it appeared that said distance may vary from 0.4 to 1.0 times the internal diameter of the vessel.

As in the vessel according to the invention the variation in the residence time of the particles is small, they are subjected to a substantially equal treatment, so that said vessel is particularly suitable to be used as a reactor for the hydrolysis of a starch suspension by adding enzymes and according to which the already prehydrolyzed mass in the reactor is maintained at a temperature of about 85° C. during about 30 minutes. In the reactor the viscosity of the mass is lowered to a considerable extent and the fluidity of the mass is increased by the further decomposition of dextrines to lower polysaccharides. The vessel according to the invention, however, may also be used for the continuous conversion of starch by heating the starch suspension by means of hot water in which the temperature of the water should be restricted in view of the danger for pasting the starch. The vessel should be insulated for holding the mass at the required temperature.

The vessel described is also suitable for treating glucose juice by active carbon for withdrawing organic colouring matter and proteins from the juice and for bleaching edible oil by means of bleaching earth. The vessel may further be used for continuously treating sugar juice by means of lime and for treating liquids with a suspension or a solution of catalysts.

The vessel according to the invention may also be used as a continuous crystallizer in which the discs are hollow and a cooling fluid is passed through said hollow discs in counter current to the flow of the solution to be crystallized through the vessel by using a vertical vessel also some classification of the crystals may be obtained. In vertical position the vessel may also be used as a heat exchanger for heating a liquid which is in direct contact with the heating fluid in the vessel, such as water with hot oil as heating fluid.

In horizontal position the vessel may further be used as a heat exchanger for evaporating liquids. Finally, the vessel according to the invention is also suitable for continuously dissolving, lixiviating or extracting of materials in counter current with the solvent or extracting fluid.

The vessel according to the invention has also the advantage that the consumption of energy is relatively low even when treating viscous liquids as with a low number of revolutions of the discs an efficient stirring action is obtained.

What I claim is:

1. A cylindrical vessel for treating a liquid or a liquid mass with another material in continuous operation or for cooling or heating a liquid or a liquid mass, said vessel having a smooth inner surface and being provided with discs secured on a rotating shaft, characterized, in that the discs having a closed or nearly closed surface on both sides are provided with relatively low ribs extending more or less radially with respect to their shaft and leaving a distance of several times the height of the ribs from the ribs of the directly adjacent disc.

2. A vessel according to claim 1, characterized, in that the distance between successive discs is 0.4 to 1.0 times the internal diameter of the vessel.

3. A vessel for treating a liquid comprising, in combination, a cylindrical container having a smooth inner surface and being provided with inlet and outlet ports at its opposite ends, a drive shaft extending axially through said container, a series of longitudinally spaced circular discs secured to said drive shaft within said container for rotation with the drive shaft, each disc having its periphery closely spaced with respect to said inner surface of the container to present a restricted passage therepast, said discs being spaced apart by amounts in the order of from 0.4 to 1.0 times the inner diameter of said container to provide separate cells for sequentially receiving liquid in its passage from said inlet port to said outlet port and said cells being intercommunicated sequentially only through said restricted passages, and means for circulating liquid within each cell while preventing backflow of liquid through said restricted passages between any cell and its preceding cell, said means comprising a plurality of ribs disposed generally radially and on the opposite sides of each disc, each of said ribs being of substantially greater length than height so that the distance between the ribs on opposed faces of adjacent discs constitutes a major portion of the length of each cell.

References Cited

UNITED STATES PATENTS 2,397,488   4/1946   Hougland et al. _____ 259—8

WILLIAM I. PRICE, *Primary Examiner.*